US008504730B2

(12) United States Patent
Faraj et al.

(10) Patent No.: US 8,504,730 B2
(45) Date of Patent: Aug. 6, 2013

(54) ADMINISTERING CONNECTION IDENTIFIERS FOR COLLECTIVE OPERATIONS IN A PARALLEL COMPUTER

(75) Inventors: Daniel A. Faraj, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 12/847,573

(22) Filed: Jul. 30, 2010

(65) Prior Publication Data
US 2012/0030370 A1 Feb. 2, 2012

(51) Int. Cl.
*G06F 15/16* (2006.01)
*G06F 15/00* (2006.01)

(52) U.S. Cl.
USPC ............................. 709/250; 712/28; 712/225

(58) Field of Classification Search
USPC ................. 709/201–205, 212, 213, 216, 217, 709/234, 237; 712/28, 225
See application file for complete search history.

(56) References Cited

U.S. PATENT DOCUMENTS

| | | | |
|---|---|---|---|
| 5,063,562 A | 11/1991 | Barzilai et al. |
| 5,095,444 A | 3/1992 | Motles |
| 5,491,691 A | 2/1996 | Shtayer et al. |
| 5,815,793 A | 9/1998 | Ferguson |
| 5,859,981 A | 1/1999 | Levin et al. |
| 5,862,381 A | 1/1999 | Advani et al. |
| 5,912,893 A | 6/1999 | Rolfe et al. |
| 5,918,020 A | 6/1999 | Blackard et al. |
| 5,937,201 A | 8/1999 | Matsushita et al. |
| 5,953,336 A | 9/1999 | Moore et al. |
| 5,982,771 A | 11/1999 | Caldara et al. |
| 5,999,734 A | 12/1999 | Willis et al. |
| 6,057,839 A | 5/2000 | Advani et al. |
| 6,115,357 A | 9/2000 | Packer et al. |
| 6,118,777 A | 9/2000 | Sylvain |
| 6,126,331 A | 10/2000 | Komatsu et al. |
| 6,167,490 A | 12/2000 | Levy et al. |
| 6,253,372 B1 | 6/2001 | Komatsu et al. |
| 6,336,143 B1 | 1/2002 | Diedrich et al. |
| 6,438,702 B1 | 8/2002 | Hodge |
| 6,490,566 B1 | 12/2002 | Schmidt |
| 6,600,721 B2 | 7/2003 | Edholm |

(Continued)

OTHER PUBLICATIONS

Willis, "MinSim: Optimized, Compiled VHDL Simulation Using Networked & Parallel Computers", 1993, Proceedings of Fall 1993 VHDL International User's Forumn, pp. 197-144.

(Continued)

*Primary Examiner* — Sargon Nano
(74) *Attorney, Agent, or Firm* — Biggers & Ohanian, LLP

(57) ABSTRACT

Administering connection identifiers for collective operations in a parallel computer, including prior to calling a collective operation, determining, by a first compute node of a communicator to receive an instruction to execute the collective operation, whether a value stored in a global connection identifier utilization buffer exceeds a predetermined threshold; if the value stored in the global ConnID utilization buffer does not exceed the predetermined threshold: calling the collective operation with a next available ConnID including retrieving, from an element of a ConnID buffer, the next available ConnID and locking the element of the ConnID buffer from access by other compute nodes; and if the value stored in the global ConnID utilization buffer exceeds the predetermined threshold: repeatedly determining whether the value stored in the global ConnID utilization buffer exceeds the predetermined threshold until the value stored in the global ConnID utilization buffer does not exceed the predetermined threshold.

13 Claims, 9 Drawing Sheets

U.S. PATENT DOCUMENTS

| | | | |
|---|---|---|---|
| 6,633,937 B2 | 10/2003 | Thomson | |
| 6,775,703 B1 | 8/2004 | Burns et al. | |
| 6,839,829 B1 | 1/2005 | Daruwalla et al. | |
| 7,032,224 B2 | 4/2006 | Kadakia et al. | |
| 7,458,077 B2 | 11/2008 | Duke | |
| 7,478,138 B2* | 1/2009 | Chang et al. | 709/212 |
| 7,480,298 B2* | 1/2009 | Blackmore et al. | 370/392 |
| 7,509,244 B1 | 3/2009 | Shakeri et al. | |
| 7,527,558 B2 | 5/2009 | Lavoie et al. | |
| 7,813,369 B2* | 10/2010 | Blackmore et al. | 370/429 |
| 7,953,085 B2* | 5/2011 | Chang et al. | 370/390 |
| 2001/0047458 A1* | 11/2001 | Iizuka | 711/154 |
| 2002/0065930 A1 | 5/2002 | Rhodes | |
| 2003/0021287 A1 | 1/2003 | Lee et al. | |
| 2004/0111398 A1 | 6/2004 | England et al. | |
| 2005/0138161 A1* | 6/2005 | McDaniel et al. | 709/223 |
| 2006/0075067 A1* | 4/2006 | Blackmore et al. | 709/217 |
| 2006/0107262 A1 | 5/2006 | Bodas et al. | |
| 2006/0203739 A1 | 9/2006 | Padmanabhan et al. | |
| 2007/0179760 A1 | 8/2007 | Smith | |
| 2007/0294426 A1* | 12/2007 | Huang et al. | 709/234 |
| 2008/0109569 A1 | 5/2008 | Leonard et al. | |
| 2008/0168177 A1* | 7/2008 | Subramaniam | 709/231 |
| 2008/0240115 A1 | 10/2008 | Briscoe et al. | |
| 2009/0003344 A1 | 1/2009 | Kumar | |
| 2009/0125604 A1* | 5/2009 | Chang et al. | 709/212 |

OTHER PUBLICATIONS

Final Office Action, U.S. Appl. No. 11/924,934, Jan. 6, 2012.
Advisory Action, U.S. Appl. No. 11/865,981, Oct. 14, 2011.
Advisory Action, U.S. Appl. No. 11/764,333, Nov. 28, 2011.
Notice of Allowance, U.S. Appl. No. 11/832,192, Aug. 11, 2011.
Office Action, U.S. Appl. No. 12/189,336, Dec. 9, 2011.
University of Minnesota Super Computing Institute. 2009. Derived Data Types with MPI.
William Saphir, Message Buffering and It's Effect on the Communications Performance on Parallel Computers. Apr. 1994.
University of Minnesota Super Computing Institute. 2009 MPI Performance Topics.
Final Office Action, U.S. Appl. No. 11/865,981, Jul. 22, 2011.
Moreira, et al.; The Blue Gene/L Supercomputer: A Hardware and Software Story; International Journal of Parallel Programming; Jun. 2007; pp. 181-206; vol. 35, No. 3, Springer Science+Business Media LLC.; USA.
Notice of Allowance Dated Apr. 6, 2010 in U.S. Appl. No. 11/531,846.
Final Office Action Dated Apr. 29, 2010 in U.S. Appl. No. 11/553,040.
Office Action Dated Jul. 12, 2010 in U.S. Appl. No. 11/764,282.
Office Action Dated May 3, 2010 in U.S. Appl. No. 12/180,963.
Huang et al., "DZM: MPI One-Sided Exploitation of LAIP API's Component Design, Communication Protocols & Application Tools Development", Jun. 6, 2006, pp. 1-70, IBM Corporation, Poughkeepsie, NY.
Tanenbaum, Andrew S., "Structured Computer Organization", 1984, Prentice-Hall, $2^{nd}$ Edition, pp. 10-12.
Final Office Action, U.S. Appl. No. 11/764,333, Sep. 2, 2011.
Office Action, U.S. Appl. No. 12/135,604, Nov. 4, 2011.
Notice of Allowance, U.S. Appl. No. 12/166,748, Nov. 9, 2011.
Nenad Stankovic Kang Zhang, Visual Programming for Message-Passing Systems (1999), International Journal of Software Engineering and Knowledge Engineering.
Matthew J. Sottile, Vaddadi P. Chandu, David A. Bader, Performance analysis of parallel programs via message-passing graph traversal, College of Computing, Georgia Institute of Technology, Feb. 25, 2006.
"MPI-2: Extensions to the Message-Passing Interface," Forum, Nov. 15, 2003.
Office Action, U.S. Appl. No. 11/946,934, Nov. 24, 2010.
Office Action, U.S. Appl. No. 11/924,934, Aug. 19, 2010.
Notice of Allowance, U.S. Appl. No. 11/764,282, Dec. 10, 2010.
Office Action, U.S. Appl. No. 11/832,192, Oct. 29, 2010.
Office Action, U.S. Appl. No. 12/166,748, May 27, 2010.
Office Action, U.S. Appl. No. 12/166,748, Aug. 25, 2010.
Notice of Allowance, U.S. Appl. No. 12/180,963, Oct. 20, 2010.
Final Office Action, U.S. Appl. No. 12/166,748, Mar. 7, 2011.
Final Office Action, U.S. Appl. No. 11/832,192, Apr. 13, 2011.
Office Action, U.S. Appl. No. 11/764,333, Apr. 13, 2011.
Final Office Action, U.S. Appl. No. 11/924,934, Feb. 24, 2011.
Notice of Allowance, U.S. Appl. No. 11/946,136, Mar. 4, 2011.
Office Action, U.S. Appl. No. 11/865,921, Feb. 2, 2011.

* cited by examiner

ADMINISTERING CONNECTION IDENTIFIERS FOR COLLECTIVE OPERATIONS IN A PARALLEL COMPUTER

BACKGROUND OF THE INVENTION

1. Field of the Invention

The field of the invention is data processing, or, more specifically, methods, apparatus, and products for administering connection identifiers for collective operations in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

In parallel computers, administering collective operations among many hundreds or thousands of compute nodes often present challenges to the science of automated computing machinery. Each collective operation must be assigned a unique connection identifier. In many parallel computer the number of available connection identifiers is limited. Present techniques of allocating such a scarce resource among compute nodes, groups of compute nodes, and the like, is often inequitable and inefficient.

SUMMARY OF THE INVENTION

Methods, apparatus, and products for administering connection identifiers for collective operations in a parallel computer are disclosed. Administering connection identifiers in accordance with embodiments of the present invention includes, prior to calling a collective operation, determining, by a first compute node of a communicator to receive an instruction to execute the collective operation, whether a value stored in a global connection identifier ('ConnID') utilization buffer exceeds a predetermined threshold, the value stored in the global ConnID utilization buffer representing a number of connection identifiers in use. If the value stored in the global ConnID utilization buffer does not exceed the predetermined threshold, administering connection identifiers in accordance with embodiments of the present invention includes: calling the collective operation with a next available ConnID including retrieving, from an element of a ConnID buffer, the next available ConnID and locking the element of the ConnID buffer from access by other compute nodes. If the value stored in the global ConnID utilization buffer exceeds the predetermined threshold, administering connection identifiers in accordance with embodiments of the present invention includes: repeatedly determining whether the value stored in the global ConnID utilization buffer exceeds the predetermined threshold until the value stored in the global ConnID utilization buffer does not exceed the predetermined threshold.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
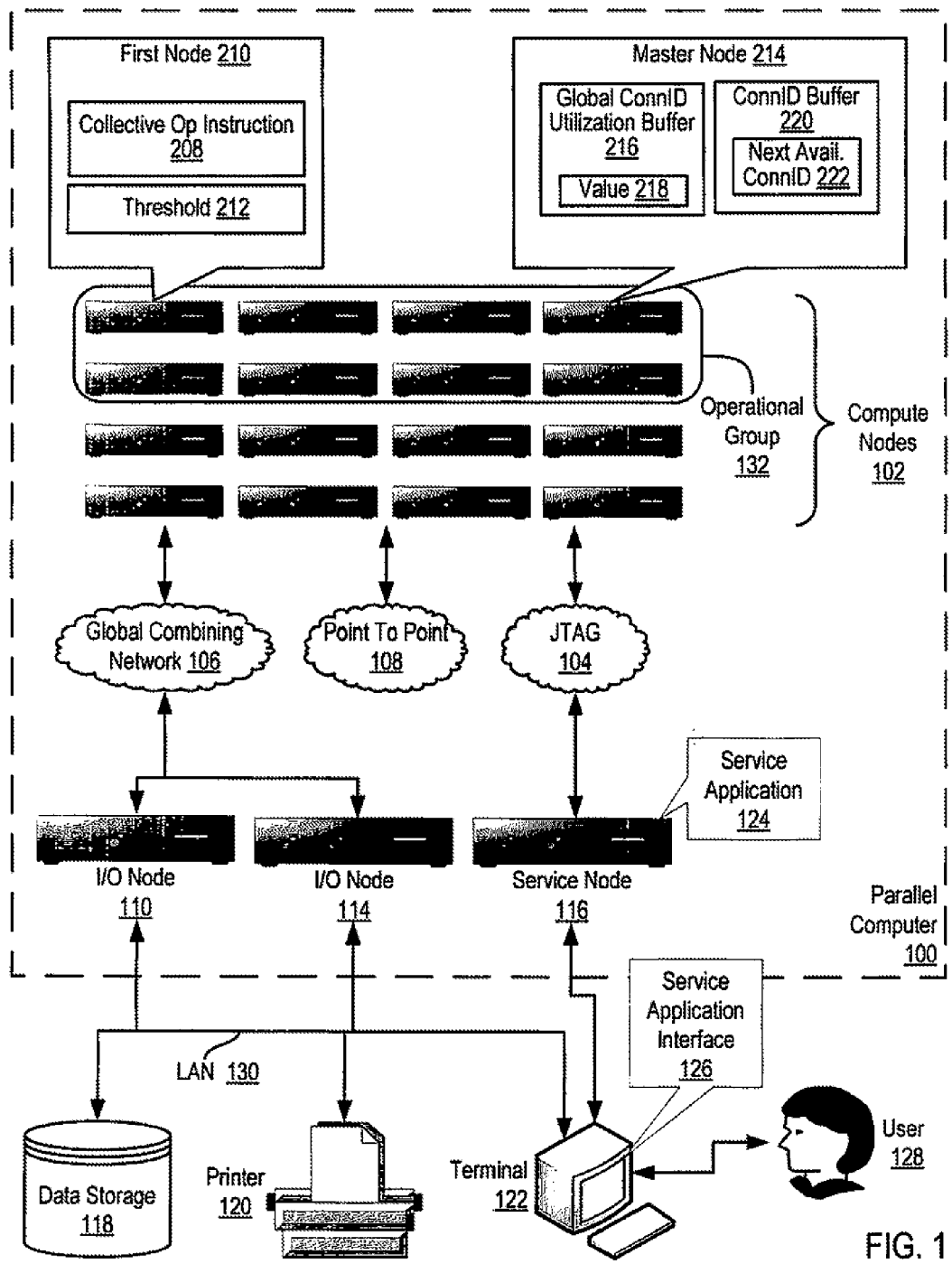
FIG. 1 illustrates an exemplary system for administering connection identifiers for collective operations in a parallel computer according to embodiments of the present invention.

Exemplary methods, apparatus, and products for administering connection identifiers for collective operations in a parallel computer in accordance with embodiments of the present invention are described with reference to the accompanying drawings, beginning with FIG. 1. FIG. 1 illustrates an exemplary system for administering connection identifiers for collective operations in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The system of FIG. 1 operates generally for administering connection identifiers for collective operations in a parallel computer according to embodiments of the present invention. A connection identifier as the term is used here is a value that uniquely identifies a particular collective operation with respect to other collective operations. Connection identifiers may be embedded in data communications message associated with a collective operation—messages containing collective operation work data, collective operation intermediate results, collective operation commands, and the like—such that compute nodes receiving and forwarding such data communications message are able to differentiate between messages of multiple different collective operations. No two concurrently executing collective operations have the same connection identifier.

In some embodiments, a header in each data communications packet relating to a collective operation includes a connection identifier in the form of a bit pattern or set of bits uniquely identifying a particular collective operation. In some parallel computers, the number of possible, or said another way, 'available,' connection identifiers is limited. The number of available connection identifiers may be limited for various reasons. One reason, for example, is that in some parallel computers, the size of each packet header, and more specifically, the size of connection identifier is limited in size or set to a fixed number of bits. In some parallel computers, for example, the portion of a packet header representing the connection identifier is limited to 5 bits in length, allowing for a maximum of 32 concurrent and unique connection identifiers.

In parallel computers of the prior art having multiple communicators—groups of processes or, as in the example of FIG. 1, an operational group (132) of compute nodes—equitable allocation of the limited number of connection identifiers among the communicators is often a difficult, if not impossible task. Prior art techniques for allocating connection identifiers typically involve assigning a set number of connection identifiers to a 'parent' or first communicator, where the parent communicator reallocates connection identifiers in equal amounts to all sub-communicators created by the parent communicator. Consider, as an example, a parent communicator that is originally allocated 32 connection identifiers. When the parent communicator splits to create a subcommunicator, the parent communicator may be configured to provide 16 connection identifiers to the newly created subcommunicator; half of the 32 connection identifiers originally allocated to the communicator. At this point, there are two communicators operating in the parallel computer and each has the same number of connection identifiers available for use in executing collective operations. However, either of the subcommunicator or the parent communicator may split and allocate connection identifiers again, such that three communicators begin operating in the parallel computer with one allocated 16 connection identifiers and the other two communicators each allocated 8 connection identifier for use in executing collective operations. In this case, connection identifiers are inequitably allocated among multiple communicators: 16, 8, and 8.

Even when two communicators, each being allocated an equal number of connection identifiers, are operating in a parallel computer, the allocation may be inequitable in operation rather than numerically. Consider, for example, that the parent communicator executes far fewer collective operations than the subcommunicator. In this example, the subcommunicator may be forced to wait for one collective operation to complete and release a connection identifier before processing a subsequent collective operation. At the same time, however, the parent communicator, executing far fewer collective operations than the subcommunicator may have one or more connection identifiers available. That is, in some embodiments one communicator may have more need for a larger number of connection identifiers than another.

In contrast to such prior art techniques for allocating connection identifiers, and as mentioned above, the system of FIG. 1 operates generally for administering connection identifiers for collective operations in a parallel computer according to embodiments of the present invention. Prior to calling a collective operation, a first compute node of a communicator to receive an instruction (208) to execute the collective operation determines whether a value (218) stored in a global connection identifier ('ConnID') utilization buffer exceeds a predetermined threshold (212). In the example parallel computer (100) of FIG. 1, the value (218) stored in the global ConnID utilization buffer (216) represents a number of connection identifiers in use. The ConnID utilization buffer (216) is 'global' in that any compute node, regardless of the compute node's communicator or operational group (132), may access the global ConnID utilization buffer (216). The global ConnID utilization buffer (216) may be implemented in various ways including, for example, as an integer stored in a memory location well-known to the compute nodes of the parallel computer (100) of FIG. 1. Such a memory location may be established as a shared memory region at program initialization and the memory location provided to each compute node. In the parallel computer of FIG. 1, the compute node that stores the global ConnID utilization buffer (216) is a master node (214). A 'master' node is a compute node configured to store a global ConnID utilization buffer (218) and a ConnID buffer (220).

If the value stored in the global ConnID utilization buffer (216) does not exceed the predetermined threshold (212), the first node (210) may call the collective operation with a next available ConnID (222). In the system of FIG. 1, calling the collective operation with a next available ConnID (222) includes atomically: retrieving, from an element of a ConnID buffer (220), the next available ConnID (222) and locking the element of the ConnID buffer (220) from access by other compute nodes (102).

If the value stored in the global ConnID utilization buffer exceeds the predetermined threshold, the first node (210) in the example of FIG. 1 repeatedly determines whether the value (218) stored in the global ConnID utilization buffer (216) exceeds the predetermined threshold (212) until the value stored in the global ConnID utilization buffer (218) does not exceed the predetermined threshold (212). That is, when there are no connection identifiers available (all ConnIDs are in use), a node seeking a connection identifier repeatedly checks the global ConnID utilization buffer (216) until a connection identifier is available.

The master node (214) and first node (210) are depicted as separate nodes in the example of FIG. 1 for clarity of explanation, but readers of skill in the art will recognize that for purposes of administering ConnIDs in accordance with embodiments of the present invention, the master node and first mode may be one and the same when the first node to receive an instruction to call a collective operation is the master node.

The arrangement of nodes, networks, and I/O devices making up the exemplary system illustrated in FIG. 1 are for explanation only, not for limitation of the present invention. Data processing systems capable of administering connection identifiers for collective operations in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers configured according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Administering connection identifiers for collective operations in a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of administering connection identifiers for collective operations according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (208), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
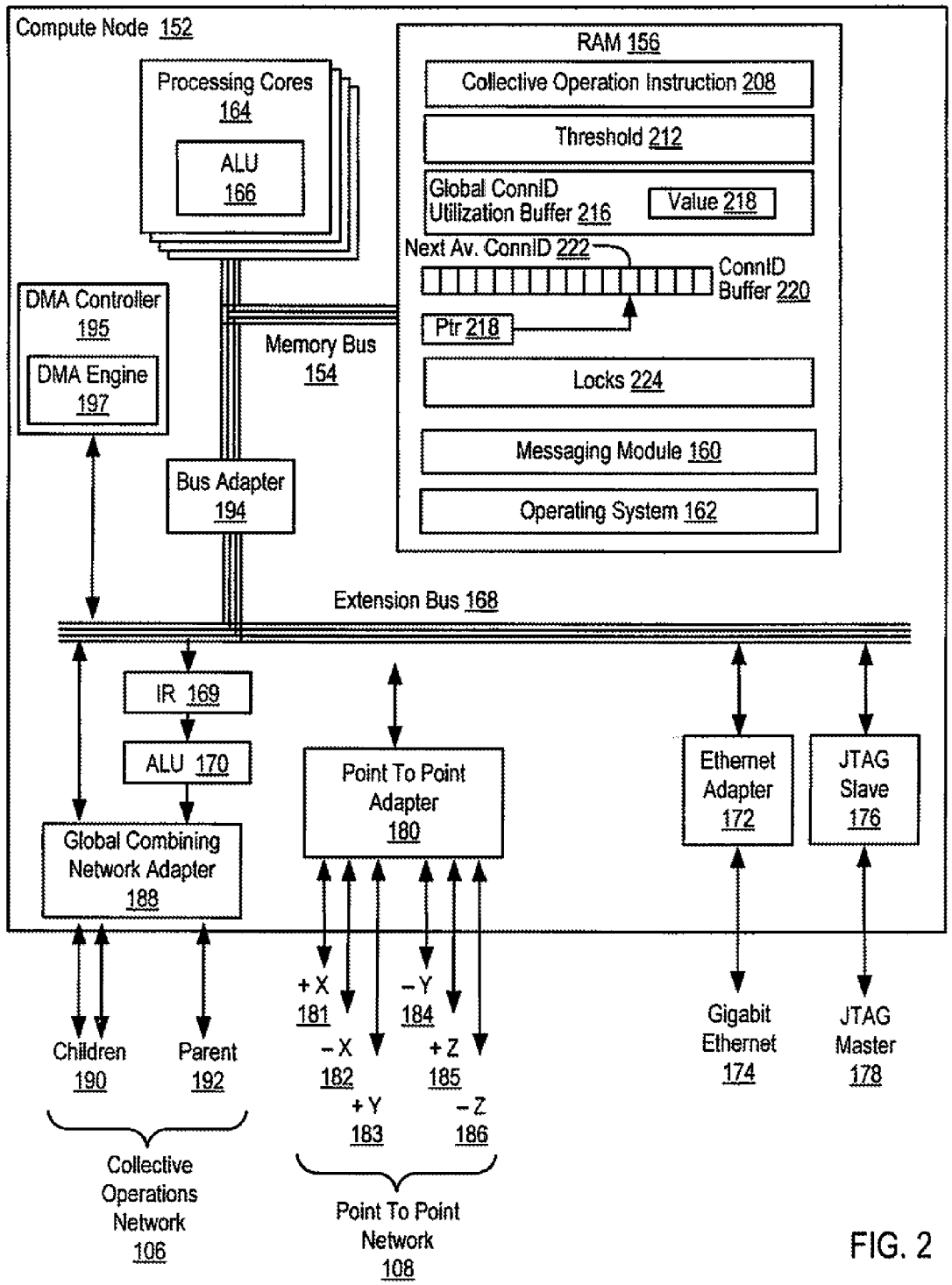
FIG. 2 sets forth a block diagram of an exemplary compute node useful in a parallel computer capable of administering connection identifiers for collective operations in a parallel computer according to embodiments of the present invention.

The messaging module (160) in the example of FIG. 2 may also be configured to administer connection identifiers for collective operations in a parallel computer in accordance with embodiments of the present invention. The compute node (152) in the example of FIG. 2 is a first compute node of a communicator to receive an instruction to execute a collective operation. Prior to calling the collective operation, the compute node (152) determines whether a value (218) stored in a global connection identifier (ConnID') utilization buffer (216) exceeds a predetermined threshold (212). In the example of FIG. 2, the value (218) stored in the global ConnID utilization buffer (216) represents a number of connection identifiers in use.

If the value (218) stored in the global ConnID utilization buffer (216) does not exceed the predetermined threshold (212), the messaging module (160) of the compute node (152) calls the collective operation with a next available ConnID (222). In the example of FIG. 2, calling the collective operation with a next available ConnID (222) includes atomically: retrieving, from an element of a ConnID buffer (220), the next available ConnID (222) and locking the element of the ConnID buffer (220) from access by other compute nodes. In the example of FIG. 2, retrieving a next available ConnID (222) may be carried out by incrementing a ConnID buffer pointer to a next, unlocked element of the ConnID buffer. A next available ConnID is a ConnID stored in a next, unlocked element of a ConnID buffer. An element of a buffer may be 'locked' in various ways. One such way, for example, includes providing a bit pattern of locks (224) in which each bit is associated with an element and the value of the bit indicates whether the associated element is locked. A binary value of '1,' for example, may represent a locked element while a value of a '0' represents an unlocked element. The compute node (152), in such an example, may identify an element by use of the pointer (218) and then determine from the bit pattern of locks (224), whether the element is locked. If the element is locked, the compute node may increment the pointer (218) and again check the locks (224). The compute node (152) may increment and check until discovering an element that is unlocked. The process of retrieving and locking is described here as being carried out 'atomically.' An atomic operation is, in fact, a plurality of operations that are combined from the perspective of other compute nodes into a single operation. During an atomic operation, no other compute node may operate on the same value. During a fetch and increment operation for example, the node executing a fetch and increment operation cannot be interrupted after fetching and before incrementing. Another compute node, for example, cannot alter the value being fetched after the node executing the fetch and increment fetches the value, but before the node increments the value.

If the value stored in the global ConnID utilization buffer exceeds the predetermined threshold, the messaging module (160) of the compute node (152) in the example of FIG. 2 repeatedly determines whether the value stored in the global ConnID utilization buffer ( ) exceeds the predetermined threshold until the value stored in the global ConnID utilization buffer does not exceed the predetermined threshold (212).

In the example FIG. 2, the compute node operates both as a first node to receive an instruction to execute a collective operation and as a master node upon which is stored the global ConnID utilization buffer (216) and ConnID buffer (220) for clarity of explanation only, not limitation. Readers of skill in the art will immediately recognize that the global ConnID utilization buffer (216) and ConnID buffer (220) may be stored on any compute node in a parallel computer.

Although administering ConnIDs in accordance with embodiments of the present invention is described in the example of FIG. 2 as being carried out by the messaging module (160), readers will understand that the DMA Controller (195) and DMA Engine (197) may also carry out some or all of the methods described here.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems that administer connection identifiers for collective operations in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system.

The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in administering connection identifiers for collective operations in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
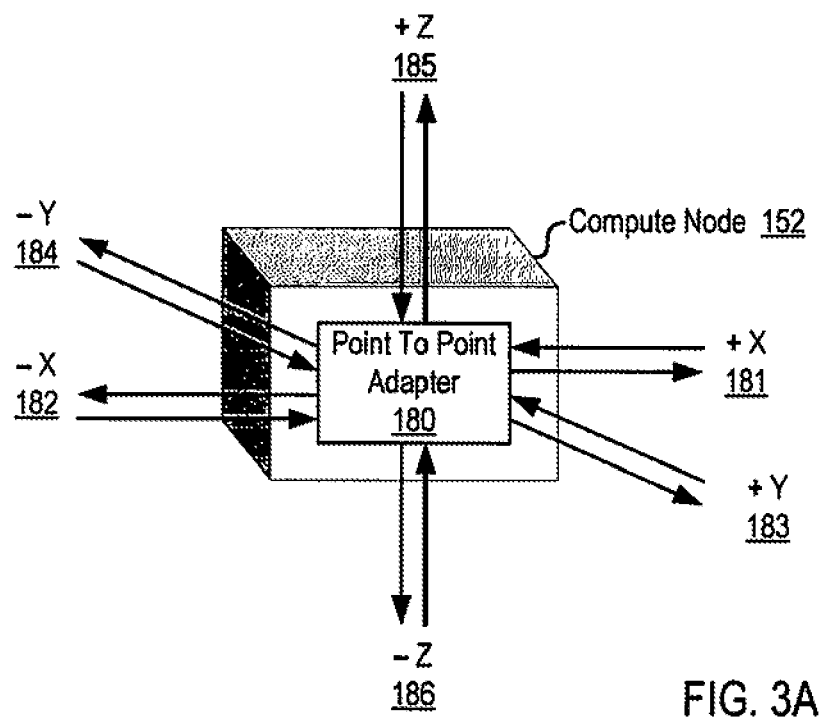
FIG. 3A illustrates an exemplary Point To Point Adapter useful in systems capable of administering connection identifiers for collective operations in a parallel computer according to embodiments of the present invention.

For further explanation, FIG. 3A illustrates an exemplary Point To Point Adapter (180) useful in systems capable of administering connection identifiers for collective operations in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
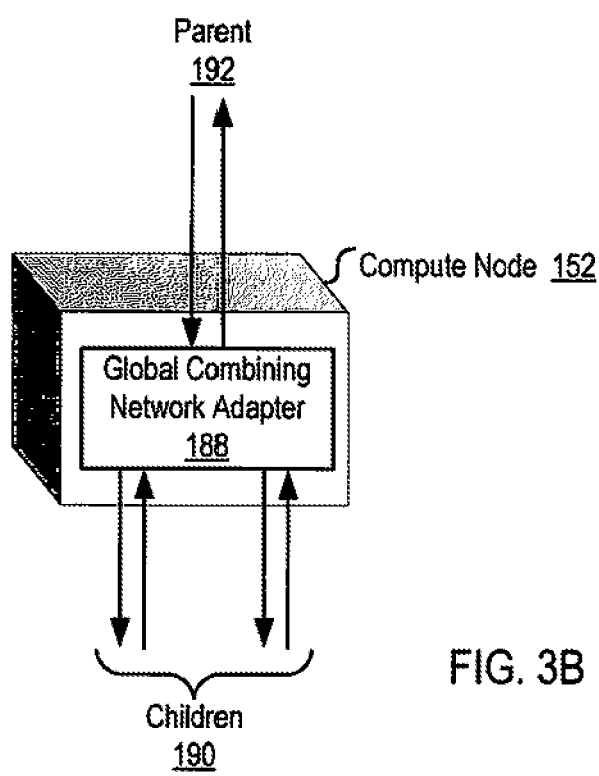
FIG. 3B illustrates an exemplary Global Combining Network Adapter useful in systems capable of administering connection identifiers for collective operations in a parallel computer according to embodiments of the present invention.

For further explanation, FIG. 3B illustrates an exemplary Global Combining Network Adapter (188) useful in systems capable of administering connection identifiers for collective operations in a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
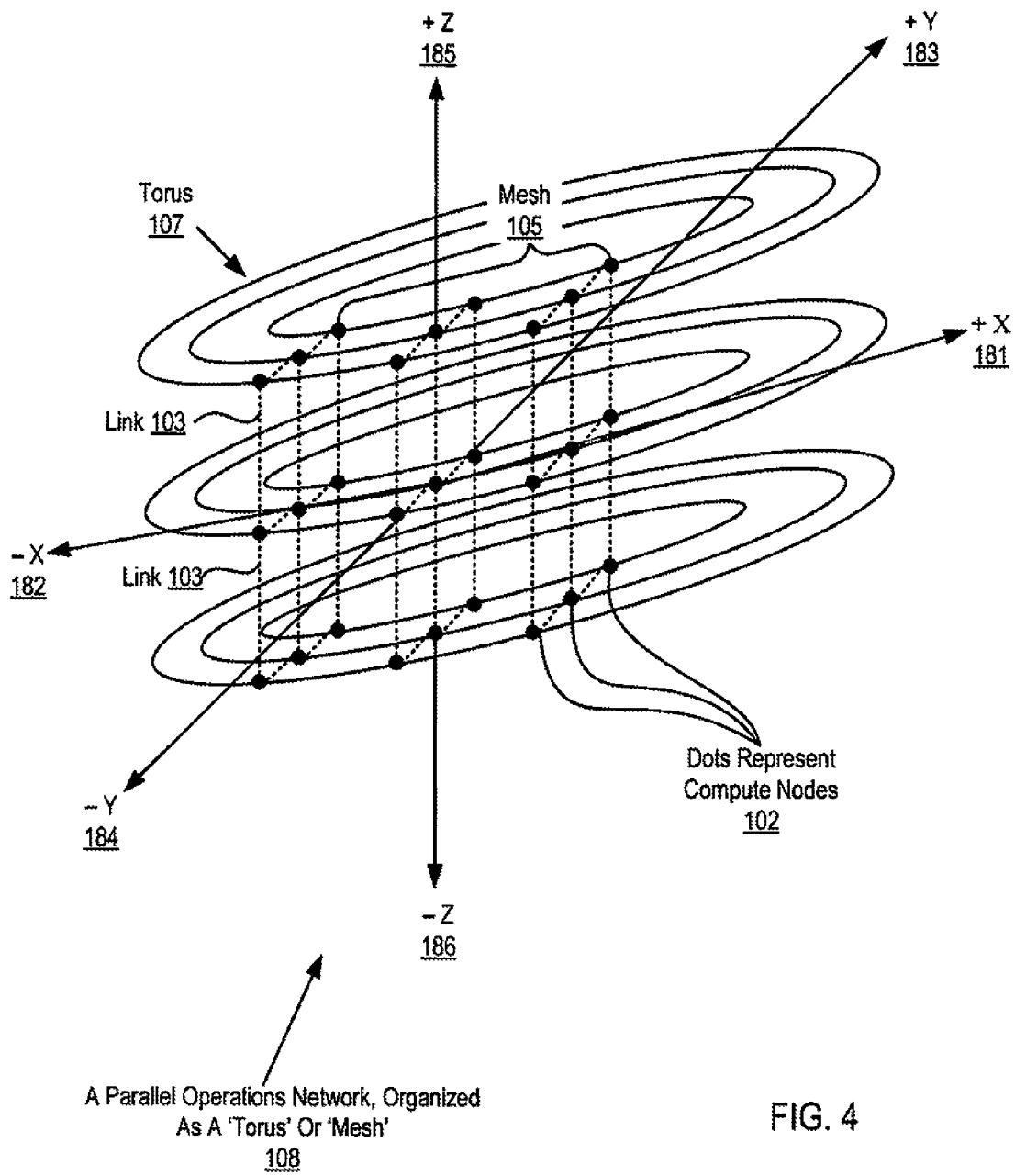
FIG. 4 sets forth a line drawing illustrating an exemplary data communications network optimized for point to point operations useful in systems capable of administering connection identifiers for collective operations in a parallel computer in accordance with embodiments of the present invention.

For further explanation, FIG. 4 sets forth a line drawing illustrating an exemplary data communications network (108) optimized for point to point operations useful in systems capable of administering connection identifiers for collective operations in a parallel computer accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in administering connection identifiers for collective operations in a parallel computer in accordance with embodiments of the present invention may contain only a few compute nodes or may contain thousands of compute nodes.

Figure 5:
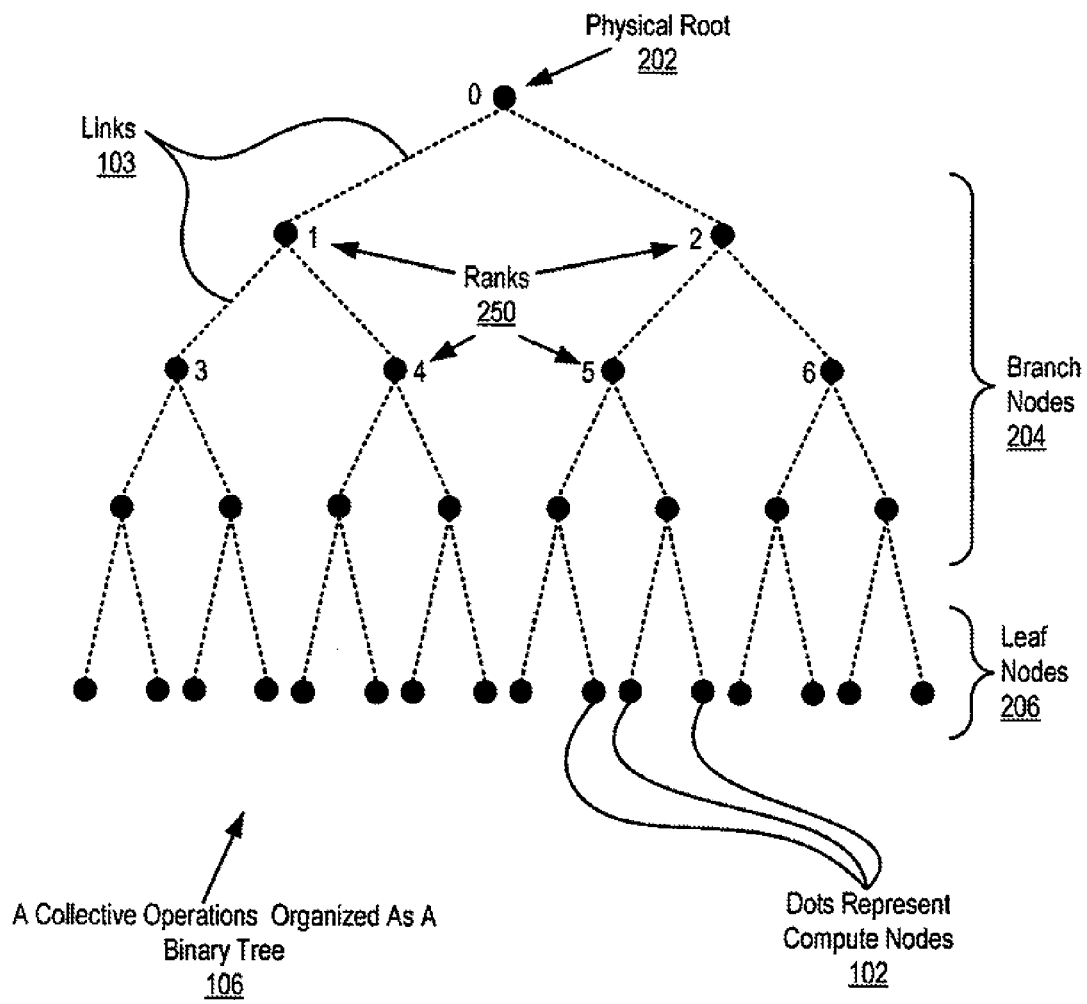
FIG. 5 sets forth a line drawing illustrating an exemplary data communications network optimized for collective operations useful in systems capable of administering connection identifiers for collective operations in a parallel computer in accordance with embodiments of the present invention.

For further explanation, FIG. 5 sets forth a line drawing illustrating an exemplary data communications network (106) optimized for collective operations useful in systems capable of administering connection identifiers for collective operations in a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems that administer connection identifiers for collective operations in a parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
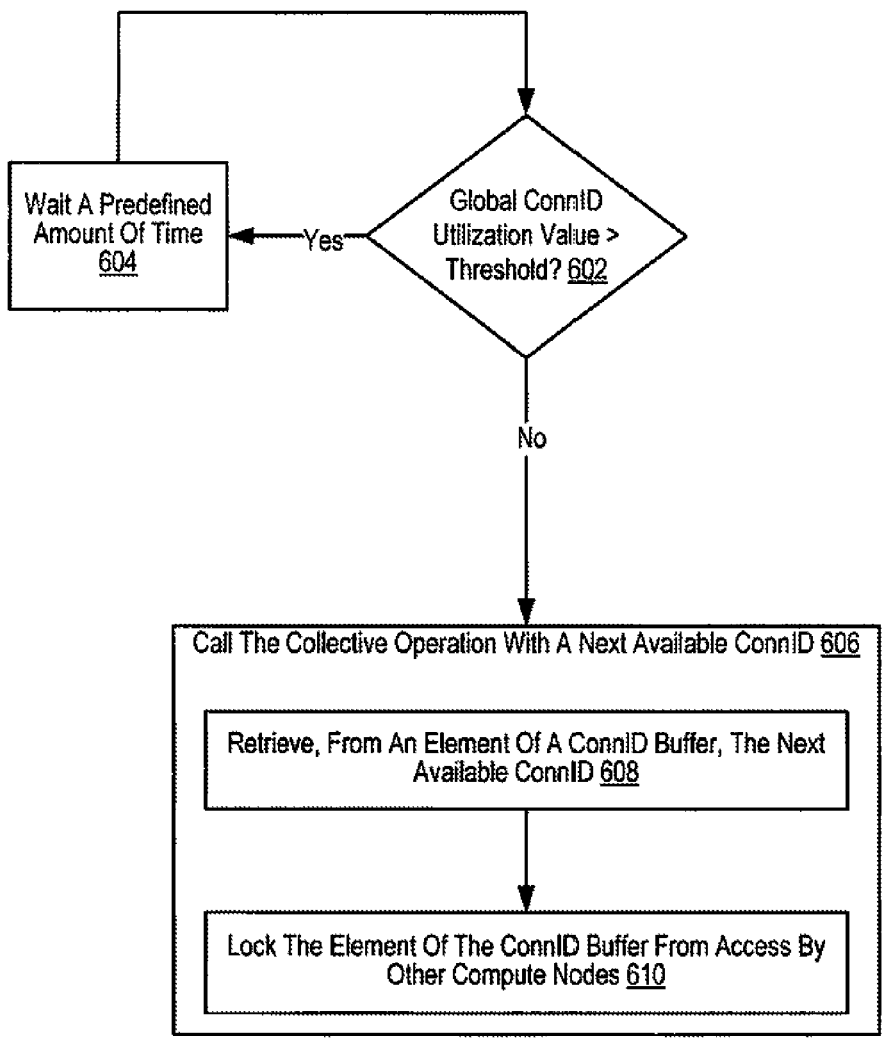
FIG. 6 sets forth a flow chart illustrating an exemplary method of administering connection identifiers for collective operations in a parallel computer according to embodiments of the present invention.

For further explanation, FIG. 6 sets forth a flow chart illustrating an exemplary method of administering connection identifiers for collective operations in a parallel computer according to embodiments of the present invention. Prior to calling (606) a collective operation, the method of FIG. 6 includes determining (602), by a first compute node of a communicator to receive an instruction to execute the collective operation, whether a value stored in a global connection identifier ('ConnID') utilization buffer exceeds a predetermined threshold. In the method of FIG. 6, the value stored in the global ConnID utilization buffer represents a number of connection identifiers in use. Determining (602), by a first compute node of a communicator to receive an instruction to execute the collective operation, whether a value stored in a global connection identifier ('ConnID') utilization buffer exceeds a predetermined threshold may be carried out by comparing the value stored in the global ConnID utilization buffer to the value of the predetermined threshold.

If the value stored in the global ConnID utilization buffer does not exceed the predetermined threshold the method of FIG. 6 continues by calling (606) the collective operation with a next available ConnID including atomically: retrieving (608), from an element of a ConnID buffer, the next available ConnID and locking (610) the element of the ConnID buffer from access by other compute nodes. Retrieving (608) the next available ConnID may be carried out by incrementing a ConnID buffer pointer to a next, unlocked element of the ConnID buffer. Locking (610) the element may be carried out by setting the value of a bit in bit pattern of locks to a logic 1, where the bit is associated with the element.

If the value stored in the global ConnID utilization buffer exceeds the predetermined threshold, the method of FIG. 6 continues by waiting (604) a predefined amount of time and again determining (602) whether the value stored in the global ConnID utilization buffer exceeds the predetermined threshold. That is, in the method of FIG. 6, the first node repeatedly determines (602) whether the value stored in the global ConnID utilization buffer exceeds the predetermined threshold until the value stored in the global ConnID utilization buffer does not exceed the predetermined threshold. In this way, the first node effectively waits until a ConnID is available, repeated checking for an available ConnID.

Figure 7:
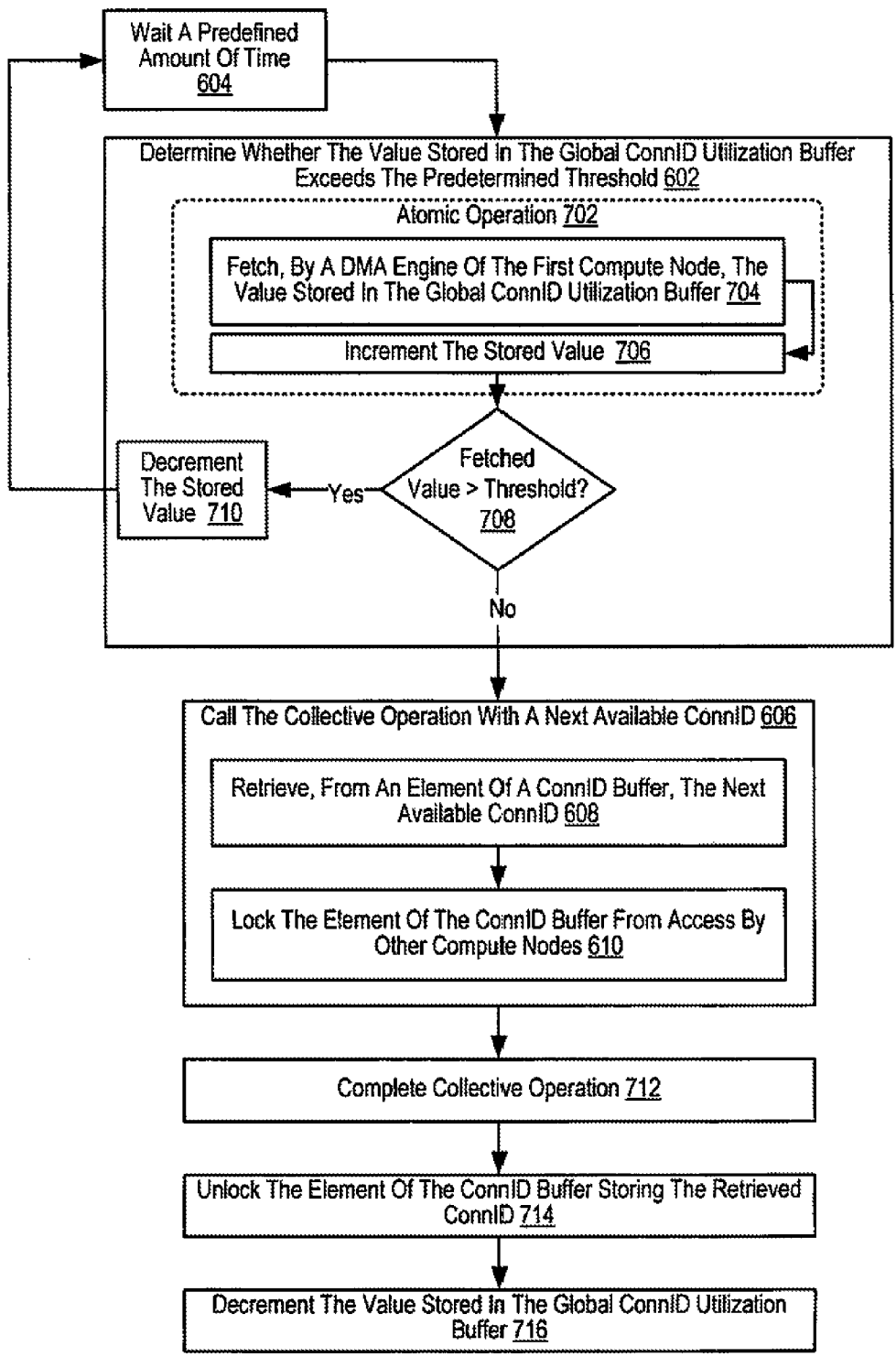
FIG. 7 sets forth a flow chart illustrating a further exemplary method of administering connection identifiers for collective operations in a parallel computer according to embodiments of the present invention.

For further explanation, FIG. 7 sets forth a flow chart illustrating a further exemplary method of administering connection identifiers for collective operations in a parallel computer according to embodiments of the present invention. The method of FIG. 7 is similar to the method of FIG. 6 including as it does determining (602) whether a value stored in a global connection identifier ('ConnID') utilization buffer exceeds a predetermined threshold, calling (606) the collective operation with a next available ConnID if the value stored in the global ConnID utilization buffer does not exceed the predetermined threshold, and repeatedly determining (602) after a waiting time (604), whether the value stored in the global ConnID utilization buffer exceeds the predetermined threshold until the value stored in the global ConnID utilization buffer does not exceed the predetermined threshold.

The method of FIG. 7 differs from the method of FIG. 6, however in that in the method of FIG. 7 determining (602) whether a value stored in a global ConnID utilization buffer exceeds a predetermined threshold is carried out with an atomic operation (702) that includes fetching (704), by a Direct Memory Access (DMA') engine of the first compute node, the value stored in the global ConnID utilization buffer and incrementing (706) the stored value. An atomic operation is a set of operations that are combined from the perspective of other compute nodes into a single operation. During an atomic operation, no other compute node may operate on the same value. During a fetch and increment operation for example, the node executing the fetch and increment operation cannot be interrupted after fetching and before incrementing. Another compute node, for example, cannot alter the value after the node executing the fetch and increment fetches the value, but before the node increments the value.

By using a DMA engine, such as the DMA engine (197) in the example of FIG. 2

In the method of FIG. 7, determining whether the value exceeds the predetermined threshold also includes determining (708) whether the fetched value exceeds the predetermined threshold. If the fetched value exceeds the threshold, the method of FIG. 7 continues by decrementing the stored value, waiting (604) a predefined amount of time, and again determining (602) whether the value stored in the global ConnID utilization buffer exceeds the predetermined threshold.

If the fetched value does not exceed the predetermined threshold, the method of FIG. 7 continues by calling (606) the collective operation with a next available ConnID. Upon completion of the collective operation, the method of FIG. 7 continues by atomically: unlocking (714) the element of the ConnID buffer storing the retrieved ConnID and decrementing (716) the value stored in the global ConnID utilization buffer. Unlocking (714) and decrementing (716) effectively releases the ConnID used to call the collective operation for use in other collective operations.

Figure 8:
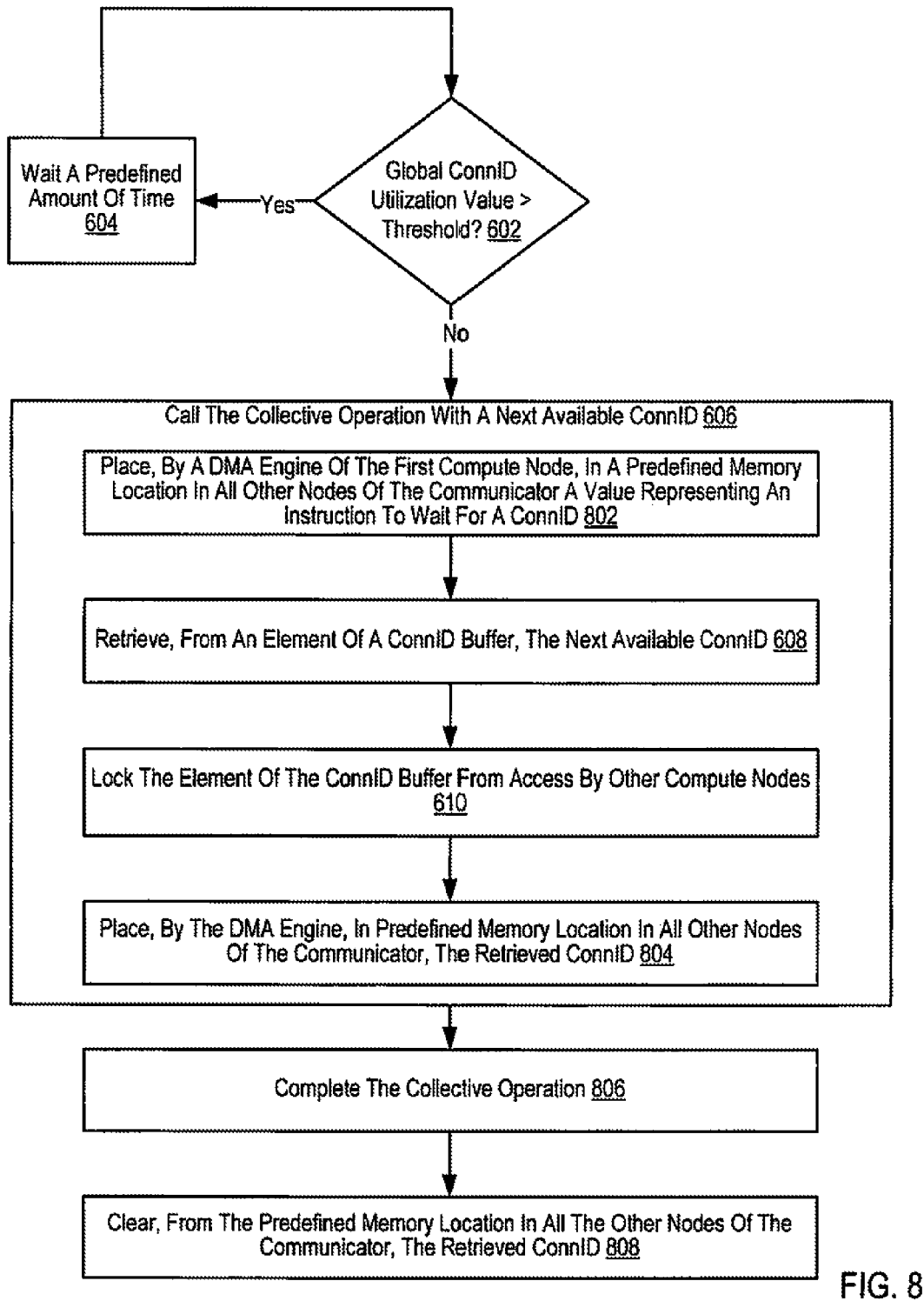
FIG. 8 sets forth a flow chart illustrating a further exemplary method of administering connection identifiers for collective operations in a parallel computer according to embodiments of the present invention.

For further explanation, FIG. 8 sets forth a flow chart illustrating a further exemplary method of administering connection identifiers for collective operations in a parallel computer according to embodiments of the present invention. The method of FIG. 8 is similar to the method of FIG. 6 including as it does determining (602) whether a value stored in a global connection identifier ('ConnID') utilization buffer exceeds a predetermined threshold, calling (606) the collective operation with a next available ConnID if the value stored in the global ConnID utilization buffer does not exceed the predetermined threshold, and repeatedly determining (602) after a waiting time (604), whether the value stored in the global ConnID utilization buffer exceeds the predetermined threshold until the value stored in the global ConnID utilization buffer does not exceed the predetermined threshold.

The method of FIG. 8 differs from the method of FIG. 7, however, in that in the method of FIG. 8 calling (606) the collective operation with a next available ConnID is carried out by placing (802), by a DMA engine of the first compute node, in a predefined memory location in all other nodes of the communicator a value representing an instruction to wait for a ConnID. The value can be any value known to all compute nodes of the communicator, predefined at initialization of the communicator for example. Upon retrieving the next available ConnID, the method of FIG. 8 includes placing (804), by the DMA engine, in predefined memory location in all other nodes of the communicator, the retrieved ConnID. In this way, the first compute node makes all other compute nodes in the communicator aware that a collective operation will be called and upon retrieving the next available ConnID effectively broadcasts the ConnID to the other compute nodes.

The method of FIG. 8 also includes completing (806) the collective operation, and upon completion of the collective operation, clearing (806), from the predefined memory location in all the other nodes of the communicator, the retrieved ConnID. Clearing (806) may be carried out by storing another predefined value, zero for example, in the predefined memory location in all other nodes of the communicator.

Figure 9:
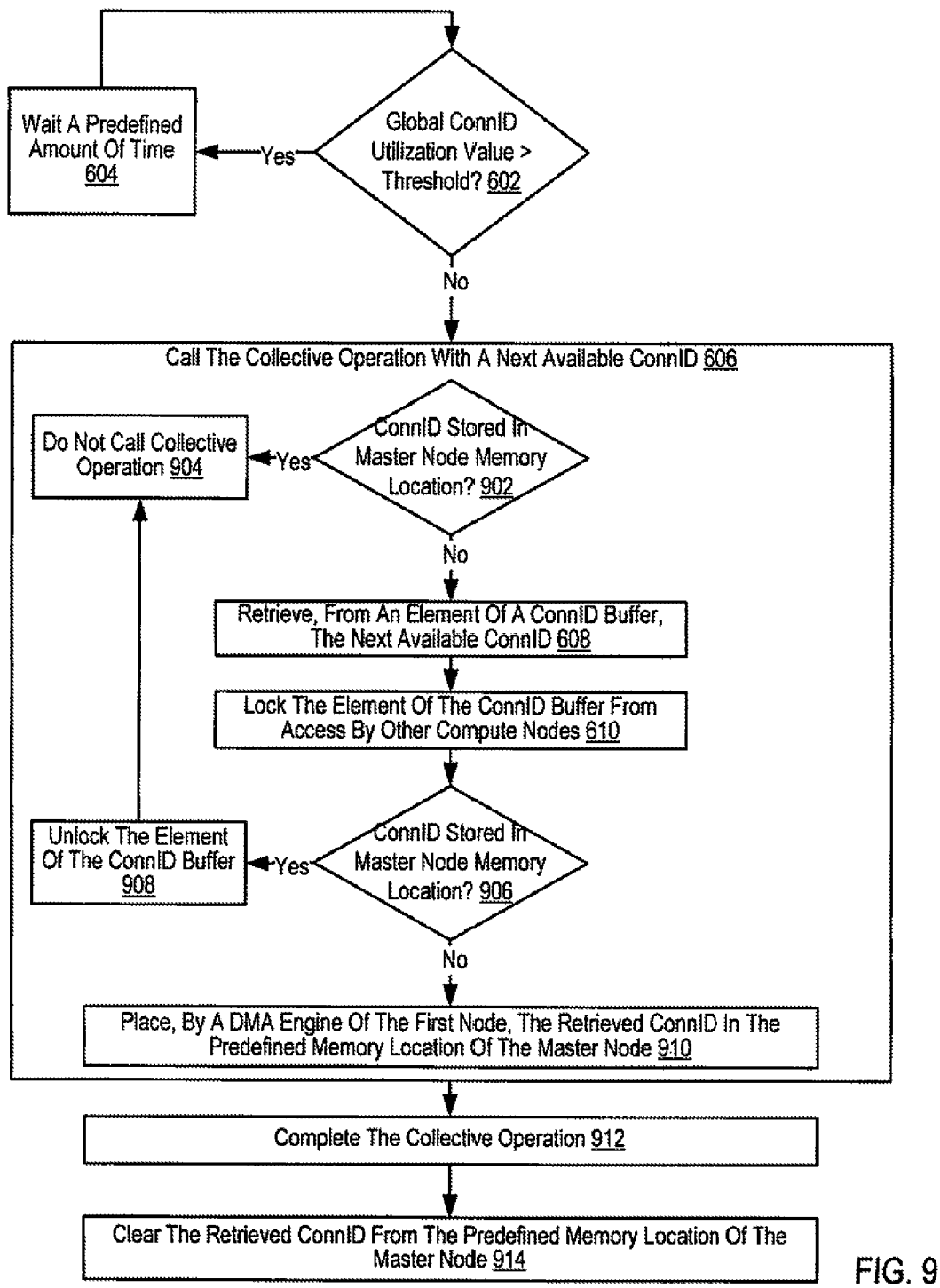
FIG. 9 sets forth a flow chart illustrating a further exemplary method of administering connection identifiers for collective operations in a parallel computer according to embodiments of the present invention.

For further explanation, FIG. 9 sets forth a flow chart illustrating a further exemplary method of administering connection identifiers for collective operations in a parallel computer according to embodiments of the present invention. The method of FIG. 9 is similar to the method of FIG. 6 including as it does determining (602) whether a value stored in a global connection identifier ('ConnID') utilization buffer exceeds a predetermined threshold, calling (606) the collective operation with a next available ConnID if the value stored in the global ConnID utilization buffer does not exceed the predetermined threshold, and repeatedly determining (602) after a waiting time (604), whether the value stored in the global ConnID utilization buffer exceeds the predetermined threshold until the value stored in the global ConnID utilization buffer does not exceed the predetermined threshold.

The method of FIG. 9 differs from the method of FIG. 8, however, in that in the method of FIG. 9 calling (806) the collective operation includes determining (902), by the first node, whether a ConnID is stored in a predefined memory location of a master node of the communicator. If a ConnID is stored in the predefined memory location another compute node is in the process of retrieving a ConnID for a collective operation, and the method continues by not (904) calling the collective operation (904), that is halting executing by the first node of the collective operation.

In the method of FIG. 9, retrieving (608), from the element of the ConnID buffer, the next available ConnID and locking (610) the element of the ConnID buffer from access by other compute nodes are carried out only if no ConnID is stored in the predefined memory location of the master node.

The method of FIG. 9 also includes again determining (906), after retrieving the next available ConnID, whether a ConnID is stored in the predefined memory location of the master node. In a embodiment in which two compute nodes are attempting to retrieving a ConnID for separate, or the same, collective operations, checking the predefined memory location of the master node insures that the two compute nodes do not interfere with one another.

If there is a ConnID stored in the predefined memory location of the master node after retrieving the next available ConnID, the method of FIG. 9 includes unlocking (908) the element of the ConnID buffer and not (904) calling the collective operation. In embodiments that include an atomic fetch and increment of the value stored in the global ConnID utilization buffer as part of determining (602) whether the value is greater than the predetermined threshold (See FIG. 7), the method of FIG. 9 may also include decrementing the value stored in the global ConnID utilization buffer after unlocking (908) the element of the ConnID buffer. That is, in some embodiments, the method of FIG. 9 may include atomically: unlocking (908) the element of the ConnID buffer and decrementing the value stored in the global ConnID utilization buffer If there is no ConnID stored in the predefined memory location of the master node after retrieving the next available ConnID, the method of FIG. 9 continues by placing (910), by a DMA engine of the first node, the retrieved ConnID in the predefined memory location of the master node. Upon completion (912) of the collective operation, the method of FIG. 9 includes clearing (914) the retrieved ConnID from the predefined memory location of the master node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for administering connection identifiers for collective operations in a parallel computer, the parallel computer having a plurality of compute nodes organized into a communicator, the apparatus comprising a computer processor and a computer memory operatively coupled to the computer processor, the computer memory having disposed within it computer program instructions that when executed by the computer processor causes the apparatus to carry out the steps of:

prior to calling a collective operation, determining, by a first compute node of a communicator to receive an instruction to execute the collective operation, whether a value stored in a global connection identifier ('ConnID') utilization buffer exceeds a predetermined threshold, the value stored in the global ConnID utilization buffer representing a number of connection identifiers in use;

if the value stored in the global ConnID utilization buffer does not exceed the predetermined threshold: calling the collective operation with a next available ConnID including, atomically:

retrieving, from an element of a ConnID buffer, the next available ConnID and locking the element of the ConnID buffer from access by other compute nodes; and if the value stored in the global ConnID utilization buffer exceeds the predetermined threshold: repeatedly determining whether the value stored in the global ConnID utilization buffer exceeds the predetermined threshold until the value stored in the global ConnID utilization buffer does not exceed the predetermined threshold.

2. The apparatus of claim 1 wherein determining whether the value stored in the global ConnID utilization buffer exceeds the predetermined threshold further comprises:
   atomically fetching, by a DMA engine of the first compute node, the value stored in the global ConnID utilization buffer and incrementing the stored value; and
   determining whether the fetched value exceeds the predetermined threshold.

3. The apparatus of claim 2 further comprising:
   upon completion of the collective operation, atomically:
   unlocking the element of the ConnID buffer storing the retrieved ConnID; and
   decrementing the value stored in the global ConnID utilization buffer.

4. The apparatus of claim 1 wherein calling the collective operation with the next available ConnID further comprises:
   placing, by a DMA engine of the first compute node, in a predefined memory location in all other nodes of the communicator a value representing an instruction to wait for a ConnID; and
   upon retrieving the next available ConnID, placing, by the DMA engine, in predefined memory location in all other nodes of the communicator, the retrieved ConnID; and
   upon completion of the collective operation, the apparatus further comprises computer program instructions capable of clearing, from the predefined memory location in all the other nodes of the communicator, the retrieved ConnID.

5. The apparatus of claim 1 wherein calling the collective operation with the next available ConnID further comprises:
   determining, by the first node, whether a ConnID is stored in a predefined memory location of a master node of the communicator;
   atomically: retrieving, from the element of the ConnID buffer, the next available ConnID and locking the element of the ConnID buffer from access by other compute nodes only if no ConnID is stored in the predefined memory location of the master node;
   again determining, after retrieving the next available ConnID, whether a ConnID is stored in the predefined memory location of the master node;
   if there is a ConnID stored in the predefined memory location of the master node after retrieving the next available ConnID, atomically unlocking the element of the ConnID buffer;
   if there is no ConnID stored in the predefined memory location of the master node after retrieving the next available ConnID:
   placing, by a DMA engine of the first node, the retrieved ConnID in the predefined memory location of the master node; and
   upon completion of the collective operation, the apparatus further comprises computer program instructions capable of clearing the retrieved ConnID from the predefined memory location of the master node.

6. The apparatus of claim 1 wherein retrieving, from an element of a ConnID buffer, a next available ConnID further comprises incrementing a ConnID buffer pointer to a next, unlocked element of the ConnID buffer.

7. A computer program product for administering connection identifiers for collective operations in a parallel computer, the parallel computer having a plurality of compute nodes organized into a communicator, the computer program product disposed in a computer readable storage device, the computer program product comprising computer program instructions that when executed by a computer causes the computer to carry out the steps of:
   prior to calling a collective operation, determining, by a first compute node of a communicator to receive an instruction to execute the collective operation, whether a value stored in a global connection identifier ('ConnID') utilization buffer exceeds a predetermined threshold, the value stored in the global ConnID utilization buffer representing a number of connection identifiers in use;
   if the value stored in the global ConnID utilization buffer does not exceed the predetermined threshold:
   calling the collective operation with a next available ConnID including, atomically: retrieving, from an element of a ConnID buffer, the next available ConnID and locking the element of the ConnID buffer from access by other compute nodes; and if the value stored in the global ConnID utilization buffer exceeds the predetermined threshold: repeatedly determining whether the value stored in the global ConnID utilization buffer exceeds the predetermined threshold until the value stored in the global ConnID utilization buffer does not exceed the predetermined threshold.

8. The computer program product of claim 7 wherein determining whether the value stored in the global ConnID utilization buffer exceeds the predetermined threshold further comprises:
   atomically fetching, by a DMA engine of the first compute node, the value stored in the global ConnID utilization buffer and incrementing the stored value; and
   determining whether the fetched value exceeds the predetermined threshold.

9. The computer program product of claim 8 further comprising:
   upon completion of the collective operation, atomically:
   unlocking the element of the ConnID buffer storing the retrieved ConnID; and
   decrementing the value stored in the global ConnID utilization buffer.

10. The computer program product of claim 7 wherein calling the collective operation with the next available ConnID further comprises:
    placing, by a DMA engine of the first compute node, in a predefined memory location in all other nodes of the communicator a value representing an instruction to wait for a ConnID; and
    upon retrieving the next available ConnID, placing, by the DMA engine, in predefined memory location in all other nodes of the communicator, the retrieved ConnID; and
    upon completion of the collective operation, the computer program product further comprises computer program instructions capable of clearing, from the predefined memory location in all the other nodes of the communicator, the retrieved ConnID.

11. The computer program product of claim 7 wherein calling the collective operation with the next available ConnID further comprises:
    determining, by the first node, whether a ConnID is stored in a predefined memory location of a master node of the communicator;
    atomically: retrieving, from the element of the ConnID buffer, the next available ConnID and locking the element of the ConnID buffer from access by other compute nodes only if no ConnID is stored in the predefined memory location of the master node;
    again determining, after retrieving the next available ConnID, whether a ConnID is stored in the predefined memory location of the master node;

if there is a ConnID stored in the predefined memory location of the master node after retrieving the next available ConnID, atomically unlocking the element of the ConnID buffer;

if there is no ConnID stored in the predefined memory location of the master node after retrieving the next available ConnID:

placing, by a DMA engine of the first node, the retrieved ConnID in the predefined memory location of the master node; and upon completion of the collective operation, the computer program product further comprises computer program instructions capable of clearing the retrieved ConnID from the predefined memory location of the master node.

12. The computer program product of claim 7 wherein retrieving, from an element of a ConnID buffer, a next available ConnID further comprises incrementing a ConnID buffer pointer to a next, unlocked element of the ConnID buffer.

13. The computer program product of claim 7 wherein the storage device comprises a recordable medium.

* * * * *